(12) United States Patent
Stanczak et al.

(10) Patent No.: US 12,464,496 B2
(45) Date of Patent: Nov. 4, 2025

(54) COORDINATION OF SIDELINK MODE-2 RESOURCE RESERVATION FOR V2X COMMUNICATIONS

(71) Applicant: NOKIA TECHNOLOGIES OY, Espoo (FI)

(72) Inventors: Jedrzej Stanczak, Wroclaw (PL); Rudraksh Shrivastava, Stuttgart (DE); Hajo Bakker, Eberdingen (DE); Vinh Van Phan, Oulu (FI); Ling Yu, Kauniainen (FI)

(73) Assignee: Nokia Technologies Oy, Espoo (FI)

( * ) Notice: Subject to any disclaimer, the term of this patent is extended or adjusted under 35 U.S.C. 154(b) by 347 days.

(21) Appl. No.: 17/309,919

(22) PCT Filed: Jan. 30, 2020

(86) PCT No.: PCT/EP2020/052263
§ 371 (c)(1),
(2) Date: Jun. 29, 2021

(87) PCT Pub. No.: WO2020/173655
PCT Pub. Date: Sep. 3, 2020

(65) Prior Publication Data
US 2022/0046593 A1 Feb. 10, 2022

Related U.S. Application Data

(60) Provisional application No. 62/810,178, filed on Feb. 25, 2019.

(51) Int. Cl.
*H04W 72/02* (2009.01)
*H04W 72/121* (2023.01)
*H04W 72/20* (2023.01)

(52) U.S. Cl.
CPC ......... *H04W 72/02* (2013.01); *H04W 72/121* (2013.01); *H04W 72/20* (2023.01)

(58) Field of Classification Search
CPC .................................................... H04W 72/02
See application file for complete search history.

(56) References Cited

U.S. PATENT DOCUMENTS

2017/0347394 A1 11/2017 Yasukawa et al.
2018/0295646 A1* 10/2018 Faurie .................. H04W 72/23
(Continued)

FOREIGN PATENT DOCUMENTS

CN    111343601 A  *  6/2020
WO    2020011336 A1    1/2020
(Continued)

OTHER PUBLICATIONS

International Search Report and Written Opinion for International Application No. PCT/EP2020/052263, mailed on May 18, 2020, 14 pages.
(Continued)

*Primary Examiner* — Abdeltif Ajid
(74) *Attorney, Agent, or Firm* — Brake Hughes Bellermann LLP

(57) ABSTRACT

A method, apparatus, and a computer-readable storage medium are provided for joint management of resources of vehicle-to-everything (V2X) communications. In one example implementation, the method may include notifying, by a first user equipment (UE), one or more second user equipments (UEs) about a first group of resources selected for sidelink communications. The first user equipment (UE) and the one or more second user equipments (UEs) belong to a group of user equipments (UEs) with the first user equipment (UE) as a lead user equipment (UE) of the group of user equipments (UEs). The example method may further
(Continued)

include receiving, by the first user equipment (UE), feedback from the one or more second user equipments (UEs); and determining, by the first user equipment, a second group of resources for sidelink communications of the group of user equipments (UEs), the second group of resources being determined based at least on the feedback received from the one or more second user equipments (UEs).

20 Claims, 5 Drawing Sheets

(56) References Cited

U.S. PATENT DOCUMENTS

| | | | |
|---|---|---|---|
| 2021/0099979 A1* | 4/2021 | Takeda | H04W 72/23 |
| 2021/0219320 A1* | 7/2021 | Belleschi | H04W 72/20 |
| 2021/0329597 A1* | 10/2021 | Kwak | H04W 4/40 |
| 2021/0385844 A1* | 12/2021 | Yuan | H04W 72/20 |
| 2022/0007210 A1* | 1/2022 | Yokomakura | H04W 92/18 |

FOREIGN PATENT DOCUMENTS

| | | | | |
|---|---|---|---|---|
| WO | WO2020169067 | * | 8/2020 | H04W 4/40 |
| WO | WO-2020169067 A1 | * | 8/2020 | H04W 72/535 |

OTHER PUBLICATIONS

3GPP TSG-RAN WG1 Meeting #74bis, R1-134535; "D2D Communication Without Network Coverage"; Guangzhou, China; Oct. 7-11, 2013; 5 pages.

Communication pursuant to Article 94(3) EPC for European Application No. 20704788.7; mailed on Mar. 13, 2024; 7 pages.

Communication pursuant to Article 94(3) EPC for European Patent Application No. 20704788.7, mailed on Feb. 18, 2025, 6 pages.

* cited by examiner

COORDINATION OF SIDELINK MODE-2 RESOURCE RESERVATION FOR V2X COMMUNICATIONS

CROSS-REFERENCE TO RELATED APPLICATIONS

This application is a national stage entry of International Application No. PCT/EP2020/052263, filed Jan. 30, 2020, entitled "COORDINATION OF SIDELINK MODE-2 RESOURCE RESERVATION FOR V2X COMMUNICATIONS" which claims the benefit of priority of U.S. Provisional Patent Application No. 62/810,178, filed Feb. 25, 2019, both of which are hereby incorporated by reference in their entireties.

TECHNICAL FIELD

This description relates to wireless communications, and in particular, to management of resources in vehicle-to-everything (V2X) communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UNITS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

A method, apparatus, and a computer-readable storage medium are provided for joint management of resources, including resource reservation and coordination, of the resources among a group of user equipments (UEs) for V2X communications.

In one example implementation, the method may include notifying, by a first user equipment (UE), one or more second user equipments (UEs) about a first group of resources selected for sidelink communications. The first user equipment (UE) and the one or more second user equipments (UEs) may belong to a group of user equipments (UEs) with the first user equipment (UE) as a lead user equipment (UE) of the group of user equipments (UEs). The example method may further include receiving, by the first user equipment (UE), feedback from the one or more second user equipments (UEs); and determining, by the first user equipment, a second group of resources for sidelink communications of the group of user equipments (UEs), the second group of resources being determined based at least on the feedback received from the one or more second user equipments (UEs).

In another example implementation, the apparatus may include at least one processor and at least one memory including computer instructions. When executed by the at least one processor, the example implementation may cause the apparatus to notify, by a first user equipment (UE), one or more second user equipments (UEs) about a first group of resources selected for sidelink communications. The first user equipment (UE) and the one or more second user equipments (UEs) may belong to a group of user equipments (UEs) with the first user equipment (UE) as a lead user equipment (UE) of the group of user equipments (UEs). The example implementation may further cause the apparatus to receive, by the first user equipment (UE), feedback from the one or more second user equipments (UEs). The example implementation may further cause the apparatus to determine, by the first user equipment, a second group of resources for sidelink communications of the group of user equipments (UEs), the second group of resources being determined based at least on the feedback received from the one or more second user equipments (UEs).

In another example implementation, the apparatus may include means for notifying, by a first user equipment (UE), one or more second user equipments (UEs) about a first group of resources selected for sidelink communications. The first user equipment (UE) and the one or more second user equipments (UEs) may belong to a group of user equipments (UEs) with the first user equipment (UE) as a lead user equipment (UE) of the group of user equipments (UEs). The apparatus may further include means for receiving, by the first user equipment (UE), feedback from the one or more second user equipments (UEs). The apparatus may further include means for determining, by the first user equipment, a second group of resources for sidelink communications of the group of user equipments (UEs), the second group of resources being determined based at least on the feedback received from the one or more second user equipments (UEs).

In another example implementation, the non-transitory computer-readable storage medium having stored thereon computer executable program code which, when executed on a computer system, may cause the computer system to include notifying, by a first user equipment (UE), one or more second user equipments (UEs) about a first group of resources selected for sidelink communications. The first user equipment (UE) and the one or more second user equipments (UEs) may belong to a group of user equipments (UEs) with the first user equipment (UE) as a lead user equipment (UE) of the group of user equipments (UEs). The example implementation may further cause the computer system to include receiving, by the first user equipment (UE), feedback from the one or more second user equipments (UEs). The example implementation may further cause the computer system to include determining, by the first user equipment, a second group of resources for sidelink communications of the group of user equipments (UEs), the second group of resources being determined based at least on the feedback received from the one or more second user equipments (UEs).

DETAILED DESCRIPTION

Figure 1:
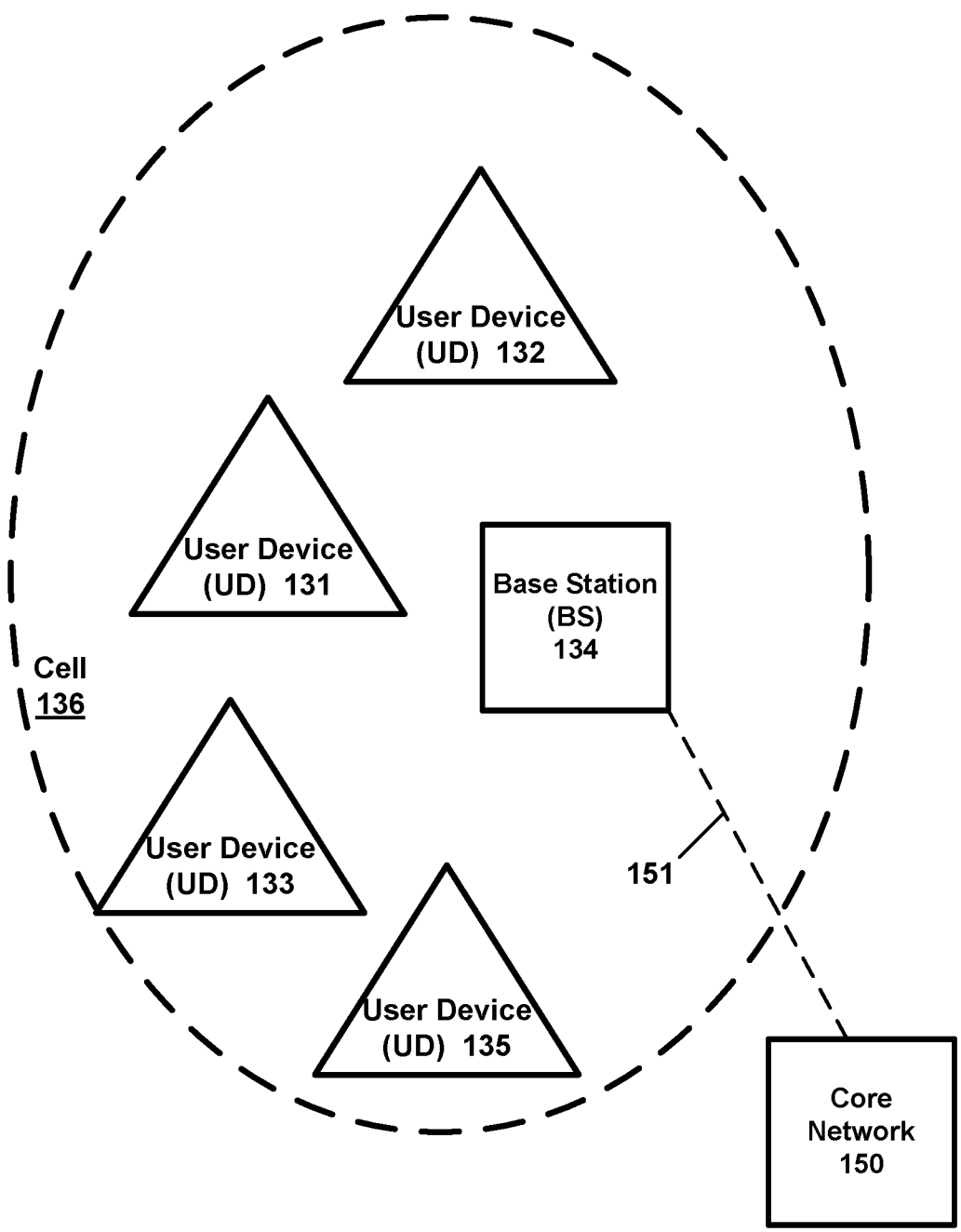
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a 51 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT) and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

3GPP is currently studying vehicle-to-everything (V2X) communication techniques to support various advanced communication services for vehicles under NR cellular network coverage. A 3GPP Rel-16 study item on 3GPP V2X was approved to study V2X enhancements to support various vehicle related communication scenarios, including V2X support for vehicles platooning, extended sensors, and advanced and remote driving. One of the scenarios to address is platooning which relies on groupcast communications, likely with a single leader UE (e.g., a platoon leader, PL) and platoon members (PMs). However, there are some challenges associated with resource allocation in such scenarios.

As per discussion at RAN2 #104 and during subsequent RAN2 e-mail discussions, no dedicated resources (e.g., resource pool) are assigned per-cast type (e.g., a separate pool for a platoon, another one for unicast pair of UEs, etc.). Thus, Mode 2 UEs would have to efficiently co-exist in a common resource pool which includes sensing and reserving resources for future transmissions over NR SL. However, it is not clear how sufficiently large amount of resources are safely guaranteed for platooning operations, even in Mode 2, where UEs are not assigned dedicated, exclusive grants for transmissions.

The proposed mechanism addresses the problem of resource allocation (RA) and/or coordination (e.g., related to set(s) of rules including indication, feedback, conflict resolution, etc.) for a group of UEs or a platoon by taking into account the resource assignment modes supported in 3GPP and the type of communication. In an example implementation, the proposed mechanism describes a method for joint resource management of the resources of V2X communications which may include notifying, by a first user equipment (UE), one or more second user equipments (UEs) about a first group of resources selected for vehicle-to-everything (V2X) communications, the first user equipment (UE) and the one or more second user equipments (UEs) of a group of user equipment (UEs) with the first user equipment (UE) as a lead user equipment (UE) of the group of user equipments (UEs); receiving, by the first user equipment (UE), feedback from the one or more second user equipments (UEs); and determining, by the first user equipment, a second group of resources for vehicle-to-everything (V2X) communications of the group of user equipments (UEs), the second group of resources being determined based at least on the feedback received from the one or more second user equipments (UEs).

Figure 2:
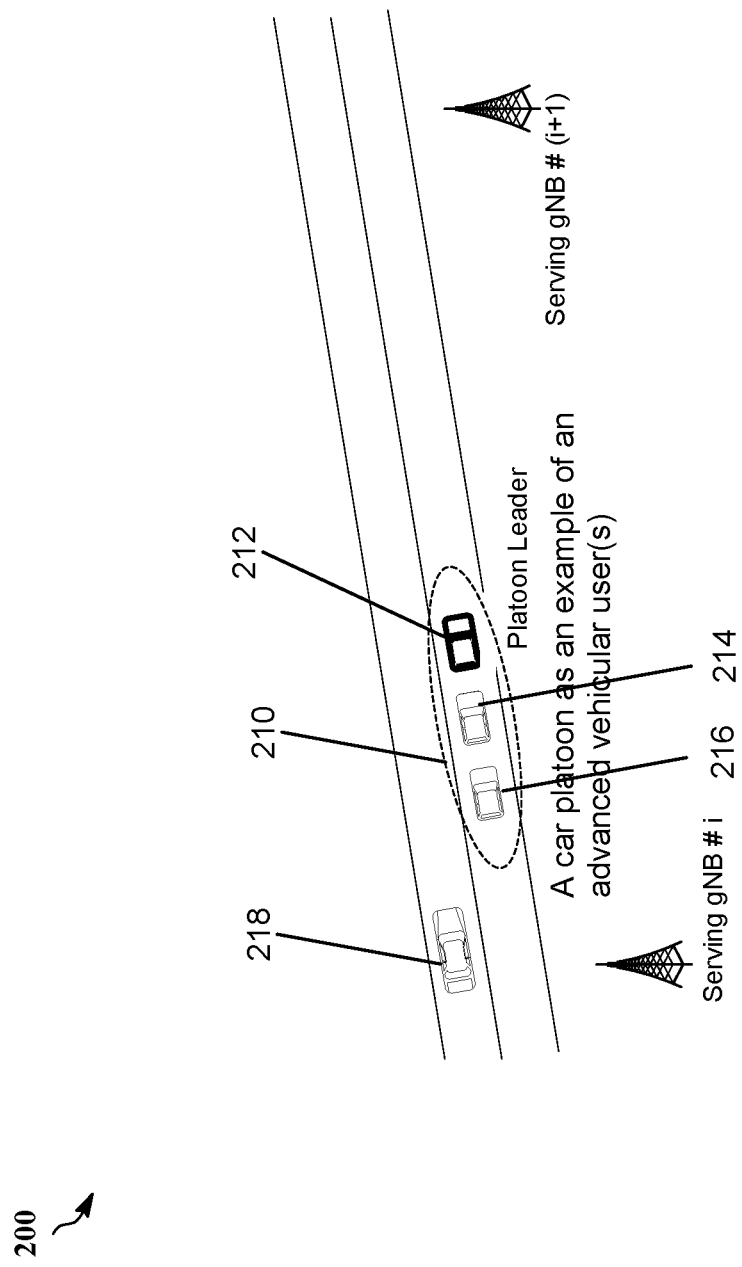
FIG. 2 is a diagram illustrating V2X communications, according to an example implementation.

FIG. 2 is a diagram 200 illustrating V2X communications, according to an example implementation.

In V2X communications, a platoon may be a convoy of vehicles which may be, for example, travelling in the same lane and/or keeping as short headway as possible between each other. The head-of-line vehicle may be referred to as a platoon leader (PL) and may be responsible for setting the pace for the platoon members (PMs). Each platoon vehicle contributes to the platoon stability by exchanging information with other vehicles about its current kinematics status and intended maneuvers, manipulating data from on-board sensors (e.g., cameras, LiDARs, radars installed in each vehicle, etc.), and acting on its actuators based on the received information. FIG. 2 illustrates a platoon 210 which may include a plurality of vehicles/PMs, e.g., 212, 214, and 216, which may be traveling as a platoon, and at least one other vehicle 218 which is not a part of platoon 210.

In an example implementation, e.g., as shown in FIG. 2, there may be communications between one or more of the cars or vehicular UEs within the platoon with a wireless network, e.g., via one or more cells that may be provided by base stations (gNBs) along the traveling path, e.g., gNB #i, gNB #(i+1), etc. Other gNBs or cells may also be provided. Also, the cars or vehicular UEs may also wirelessly communicate with each other while traveling, e.g., via device-to-device (D2D) communications over sidelink (SL) communications and/or with other vehicles (e.g., 218). Resources (e.g., wireless or radio resources) may be required for UE/gNB communications and sidelink communications between platoon members of the platoon. Thus, for example, there may be constant and/or continuous communications and thus data flows between cooperative vehicular UEs and/or between individual vehicular UEs and a central application server of an advanced vehicular user of interest. Taking platooning for an example, individual vehicles of a platoon may need to communicate with each other quickly and reliably on a regular basis and at least the platoon leader (PL) may need to communicate with a central server also fast and reliably on a regular basis. Taking a remote driving bus, truck, car or drone for another example, constant real-time data flows including high-resolution videos and driving control need to be provided between the vehicle and the network along the travelling path. Hence, the working assumption as well as motivation behind various example implementations may be as follows.

Figure 3:
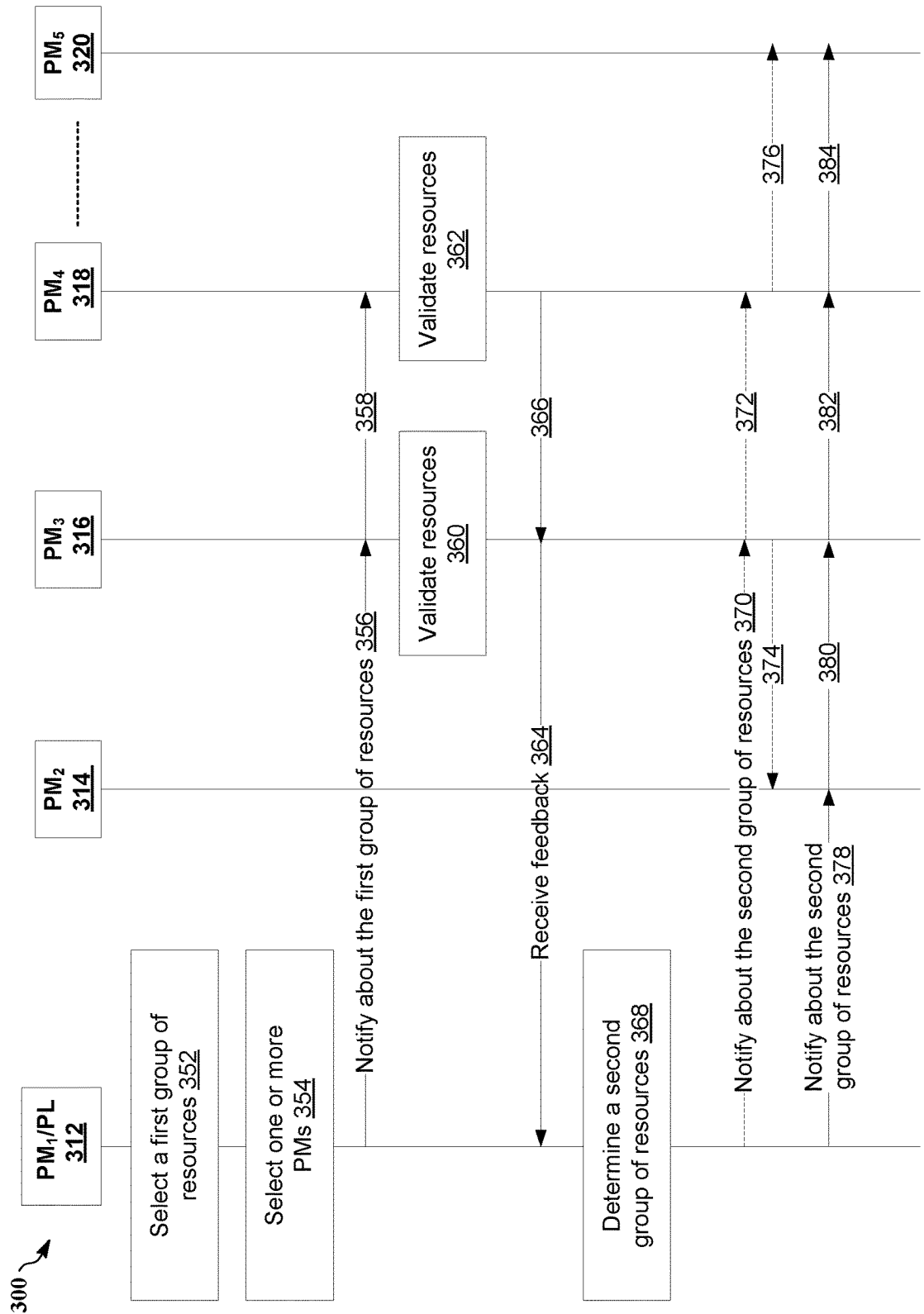
FIG. 3 is a message flow diagram illustrating joint management of resources of V2X communications, according to an example implementation.

FIG. 3 is a message flow diagram illustrating joint management of resources of V2X communications, according to an example implementation.

A platoon 310 may include platoon members (PMs): $PM_1$ 312, $PM_2$ 314, $PM_3$ 316, $PM_4$ 318, ..., and $PM_N$ 320. In an example implementation, $PM_1$ 312 may be configured as the PL for platoon 310. Although only five PMs are illustrated in platoon 310 in FIG. 3, a platoon may include any number of members. FIG. 3 illustrates an example implementation to describe the proposed mechanism for joint management of resources of V2X communications.

In some implementations, at 352, the platoon leader, e.g., PL 312 (also referred to as a lead vehicle, lead UE, or first UE) may select a group of resources, e.g., a first group of resources ($G_1$), for joint resource management of resources of V2X communications of the PMs (also referred to as a group of UEs). In some implementations, PL 312 may select the first group of resources $G_1$ from one or more pools of configured resources. In an example implementation, the pools of configured resources may be configured by a gNB (e.g., via broadcast). For example, the first group of resources $G_1$ may be selected based on, for example, relevant network-configured constraints on the allowed uses of resources and/or awareness of platoon contexts including semi-static and dynamic user contexts. In some implementations, the resource selection may be performed in a distributed manner, for example, by one or more PMs identified by the PL, as described below in detail.

In an example implementation, PL 312 may select the first group of resources $G_1$ from the one or more configured resource pools based on random selection. In another example implementation, PL 312 may select the first group of resources $G_1$ from the one or more configured resource pools by performing sensing prior to their selection (e.g., selecting a resource if the resource is not being used based on sensing). In another example implementation, the first group of resources $G_1$ may be continuous or discrete resources and which may have been selected from one or more resource pools. In another example implementation, at least one continuous portion of resources per pool per a serving carrier may be configured by a gNB.

In some implementations, the one or more pools of configured resources may be Mode-2 resources and/or PL 312 may select the first group of resources $G_1$ which may be Mode-2 resources. Mode-2 resources may be resources selected by PMs (or UEs) at random for sidelink communications and/or the resource selection by PL 312 may be done in a random manner.

At 354, the PL, e.g., PL 312, may select one or more PMs (also referred to as one or more second PMs/UEs) to assist with the joint management (e.g., assist in the coordination within the platoon for resource selection and reservation) of resources (e.g., first group of resources $G_1$) of V2X communications. In an example implementation, PL 312 may select $PM_3$ 316 and $PM_4$ 318 to assist with the joint management of the first group of resources $G_1$. In some implementations, the joint management of resources may include selecting the PMs for validating the resources and notifying about the resources (to other PMs).

At 356, the PL, e.g., PL 312, may notify the one or more second PMs (that are selected at 354) about the first group of resources $G_1$. In some implementations, PL 312 may notify the one or more second PMs (e.g., notify $PM_3$ 316 (at 356) and $PM_4$ 318 (at 358)) about the first group of resources $G_1$ via a sidelink control information (SCI) message. Although SCI generally contains information about the resource allocation of physical sidelink shared channel (PSSCH), in an example implementation, the SCI for supporting the joint management of resources of V2X communications may be a designated SCI (also referred to as enhanced SCI) that may be transmitted over a sidelink (SL) using a physical sidelink control channel (PSCCH). For example, in some implementations, PL 312 may notify $PM_3$ 316 (at 356) and $PM_4$ 318 (at 358) about the first group of resources $G_1$ via a designated SCI.

In some implementations, for example, the designated SCI described above is for the proposed joint resource management of V2X resources of a platoon and not for scheduling data transmissions (e.g., user data transmissions) over SL. Thus, the designated SCI may indicate such purpose (e.g., that the designated SCI is associated with joint management of V2X resources) to the PMs. In other words, the designated SCI may indicate that the SCI is associated with joint management of resources of V2X communications. In some implementations, the designated SCI transmitted from the PL may also indicate the first group resources $G_1$ (e.g., at least a portion of the first group of resources) being selected for joint resource management.

In an example implementation, the designated SCI may be similar to SCI proposed by 3GPP for use in V2X communications, and the designated SCI may be addressed to a preconfigured ID of the platoon (instead of targeted Rx IDs). Although, the contents of SCI for NR SL in 3GPP are still open, they have already been specified for LTE SL. As the designated SCI in the proposed joint resource management mechanism is not used for scheduling actual data transmissions over SL, some information elements (IEs) that may be in the proposed SCI for V2X communications, e.g., modulation coding scheme (MCS), transport block (TB) size, hybrid automatic repeat request (HARQ) related control information, etc., may not be needed. Therefore such unused IEs of the designated SCI may instead be used for indicating (e.g., announcing, notifying, etc.) about the selected resources to the one or more second PMs (e.g., $PM_3$ 316 and $PM_4$ 318) and/or for other control purposes such as sharing control information that may be specific to the PMs, and without affecting the design of PSCCH. In some implementations, the designated SCI may be backward and/or forward compatible with SCI.

In some implementations, PL 312 may indicate the resource selection (e.g., for joint resource management) using a Groupcast Destination Group ID that may be known by PL/PMs (e.g., resources may be selected for a specific PM or a group of PMs of the platoon). For example, the PL, e.g., PL 312, may select/reserve dedicated resources for each PM (via the above mentioned methods, e.g., sensing or random selection) and the announcement/indication of resource reservation to the PMs may be carried out by the PL using the designated SCI (or multiple SCI instances) which may include PM Application ID (based on the assumption that the platoon application defines PM Application ID and these individual application PM IDs can be known by the PL via the application itself). The PMs may map the Groupcast Destination Group ID and PM application ID to determine the resources reserved/shared for them.

In some implementations, the designated SCI can be considered as a new type of SCI sent on PSCCH for NR SL. This provides flexibility and may be made visible to platooning UEs (e.g., a group of UEs) and/or other UEs capable of using NR SL in Mode 2 and sharing Mode 2 resource pools. In an example implementation, the sending of the designated SCI on PSCCH over SL is determined and performed by PL based on relevant network-configured constraints on allowed uses of Mode 2 resources and the actual amount and number of portions of the selected Mode 2 resources.

The number of designated SCIs, e.g., SCI instances to be sent, in some implementations, may depend on the number of discrete portions (e.g., of resources) included in the selected Mode 2 resources. That is, in some cases, a single designated SCI may not be sufficient to indicate all the portions of the selected Mode 2 resources and therefore more than one designated SCI instance may be needed and sent for the joint management of resources of V2X communications of the platoon. In an example implementation, the periodicity of sending the designated SCI may be based on the individual designated SCI instance.

In some implementations, the sending of designated SCI instances may be coordinated when a plurality of designated SCI instances are needed. The coordination may consider one or more (or a combination of): timing of sending the designated SCI vs. the needs of sending regular SL Tx scheduling SCI; the capability of the PL coupled with relevant network-configured constraints in terms of sending multiple designated SCI instances simultaneously, in parallel or in serial in the same or different carriers, corresponding to multiple portions of the selected resources. The coordination may also consider sending the designated SCI instances of more preferable or dominant resource portions more frequently than that of less preferable/dominant resource portions, and possible linkage between different designated SCI instances. In another example implementation, the first designated SCI instance may be used to schedule for transmitting subsequent designated SCI instances. In this example implementation, the subsequent designated SCI instances may also be realized, for example, by using media access control (MAC) or radio resource control (RRC) signaling.

At 360, $PM_3$ may validate resources based on resource configuration information received from PL 312. Similarly, at 362, $PM_4$ 318 may validate resources based on resource configuration information received from PL 312. In an example implementation, for example, $PM_3$ 316 and/or $PM_4$ 318 may validate a portion of first group of resources $G_1$, as indicated by the PL. In another example implementation, for example, $PM_3$ 316 and/or $PM_4$ 318 may validate all of the first group of resources as indicated by the PL.

In some implementations, the validation of a resource may include sensing the resource to determine whether there is a conflict regarding the particular resource with other users in proximity. For example, whether the resource is being already used by other users in the proximity/vicinity, specifically, same or higher priority users (platooning UEs or other high-priority UEs). The validation of the resources by one or more PMs after their initial selection by the PL provides the joint management of the resources of V2X.

As described above, at 354, the PL, e.g., PL 312, may select and/or configure one or more PMs of the platoon for validating (and/or announcing at 356/358) the joint resource management of resources of V2X communications. In some implementations, PL 312 may select $PM_3$ 316 and $PM_4$ 318 (may be referred to as coordinating PMs) based on, for example, awareness of platoon contexts including semi-static and dynamic user contexts. In an example implementation, this may be combined (e.g., implemented) with the use of single or multiple designated SCI instances.

For example, the PL (e.g., PL 312) may select a head PM and a tail PM of a large platoon for validating and/or notifying (announcing) the joint resource reservation of resources for the platoon. In another example implementation, the PL (e.g., PL 312) may select all PMs of a platoon (e.g., a small platoon) to validate the resources but the PL itself may notify/announce the joint management of resources for the platoon. In another example implementation, the selected resources may include three discrete portions and therefore the PL may select three PMs so that each of the selected PMs validates and/or announces a single portion of the selected resources using a single designated SCI instance for the platoon.

In some implementations, the selecting (and/or configuring) of the one or more PMs may be based on SL signaling from the PL. The selected PMs (e.g., $PM_3$ 316 and $PM_4$ 318) may be configured to validate at least some portion of the selected resources and/or how to announce the configured resources to the PL. It should be noted that if the configured resources to the selected PMs are the same as that announced currently in the designated SCI from PL, indicating this to the selected PMs may be optional. In some implementations, the designated SCI may also indicate that all PMs need to validate all the resources for joint resource reservation for the platoon.

At 364, the PMs may provide feedback to the PL, e.g., PL 312. In an example implementation, if a resource conflict is detected by $PM_3$ 316 (e.g., when validating the resources at 360), $PM_3$ 316 may notify the PL (e.g., PL 312) by providing the conflict information via feedback. In some implementations, $PM_3$ 316 may also suggest one or more alternate resources and/or reserve the one more alternate resources for the platoon (e.g., based on favorable sensing results locally) and/or a positive acknowledgement from PL 312. Similarly, at 366, $PM_4$ 318 may provide feedback to the lead UE, if any, based on resource conflicts. In some implementations, $PM_3$ 316 and/or $PM_4$ 318 may report no conflicts. The validation of resources by the PMs (e.g., $PM_3$ 316 and/or $PM_4$ 318) assists with identifying resources that may not have conflicts with the PL but may have conflicts with one or more other PMs, as described above, for efficient/faster communications.

At 368, the PL, e.g., PL 312, may determine the second group of resources based on the feedback received from the one or more second PMs regarding he first group of resources. The PL, upon receiving the feedback from the one or more second PMs, updates the selected resources, and determines the second group of resources. For example, the PL may remove a resource selected earlier at 352 if a PM reports a conflict via the feedback. In some implementations, the feedback may be received via designated SCI sent on PSCCH or SL feedback sent on PSFCH, addressed to PL, either directly by using PL ID as Rx UE ID in SCI or indirectly by using platoon specific ID as Rx UE ID in SCI or Groupcast Destination Group IDs, or a combination of these IDs. In some implementations, MAC or RRC signaling may be used as well.

In some implementations, the PL, upon receipt of the feedback, may reselect the resources and reconfigure the PM so that the PM can validate (and/or notify) the reselected resources. In case the reselected resources are the suggested resources from the PM, the PL may send a quick feedback or confirmation to the PM. This confirmation may be realized in the same way as the notification described above.

At 370, the PL, e.g., PL 312, may notify the selected PMs, e.g., $PM_3$ 316 (and $PM_4$ 318 at 372) about the second group of resources determined at 368. It should be noted that the PL may select other PMs for notifying. This is just an example.

At 374, $PM_3$ 316 may notify $PM_2$ 314; $PM_4$ 318 may notify $PM_N$ 320 about the second group of resources. In some implementations, the selected PMs, at 374 and 376 may send designated SCI instances to announce the resource reservation for the platoon, as configured by PL. By doing so, surrounding UEs knows which resources are reserved exclusively for a platoon and the surrounding UEs may not be allowed to use the resources reserved by the platoon. In another example implementation, the PL may notify all the PMs about the second group of resources (e.g., at 378, 380, 382, and 384).

Therefore, the joint resource management mechanism described above for V2X communications provides a fast and efficient way to select, notify, and update resources.

In some implementations, a platoon leader may select and configure a subset of PMs or all PMs to sense and initially reserve a certain amount of resources for the platoon. For example, PL 312 may select $PM_3$ 316 and $PM_4$ 318 and may configure them to perform the initial joint resource management of the resources. The resources for V2X communications of the PMs are identified in a distributed manner under constraints configured by the PL (similarly to that described at step 352 above). The PL then monitors the announcements about the selected resources from the selected PMs by receiving the designated SCI instances sent on PSCCH from the selected PMs.

In some implementations, the PL may identify the resources based on the announcements received from the selected PMs and, based on that, determines the overall resources selected for the platoon. In some implementations, for example, the outcome may be one of the following or a combination thereof: a) the PL may reconfigure some of the selected PMs to stop their announcements regarding the joint resource reservation. b) the PL may reconfigure some of the selected PMs to announce at least some portion of the current joint resource reservation, as determined by the PL. c) the PL may re-select and configure a new PM (not among the earlier selected PMs) to announce at least some portion of the current joint resource reservation, as determined by the PL. d) the PL may select and configure some PMs to periodically verify at least some portions of the current joint resource reservation for the platoon in order to avoid any conflicts (when needed based on received notifications from selected PMs). In some implementations, the PL may allocate or schedule resources from the selected resources of the current joint resource reservation to individual PMs for SL communications of the platoon.

In some implementations, various combinations of the features described above may be used to facilitate optimal operations that are more flexible/adaptive. For example, a simple and effective operation based on the baseline operation of having a single designated SCI instance announced per a selected PL/PM may consider the following implementation. The PL may start out with using the baseline operation with a single designated SCI instance and select resources from a single pool of resources or carrier. As additional PMs join the platoon, more resources (e.g., Mode 2 resources) may be needed for the platoon based on the number of PMs as well as other user contexts of the platoon. The PL may then need each selected PM send a single designated SCI instance.

In some implementations, the relevant network-configured constraints on allowed use of resources (e.g., Mode 2 resources) may be pre-configured or dynamically (e.g., on-the-fly) configured to at least PL. These constraints may include at least one of (or a combination of), for example, maximum amount of Mode 2 resources (e.g., in the number of PRBs/subcarriers) from a given Mode 2 resource pool a platoon may reserve, maximum time interval the same resources from a given Mode 2 resource pool may be reserved by a platoon, priority and pre-emption permission for the platoon user class vs. other predefined user classes. In an example implementation, the pre-emption permission allows PL/PM to announce selected Mode 2 resources even when there is some conflict with other UEs from lower priority user classes. These constraints may further comprise scaling factors or parameters, taking into account, for example, different sizes or ranges of platoons (e.g., the number of PMs and distance/range to the PL). In an example implementation, the PL may be configured to sum up the network configured constraints of each individual PM based on the size of the platoon and use the summed results as the constraints for resource selection and reservation for the platoon. The dynamic configuration of these constraints to at least the PL may be realized using broadcast common signaling or dedicated signalling from, for example, serving gNB. In an example implementation, this configuration may be signalled together with Mode 2 resource pool configuration.

In some implementations, the platoon contexts including semi-static as well as dynamic user contexts may include: platoon sizes or dimensions as well as communication demands for platooning services over SL (e.g., number of PMs, inter-distance of PMs or range/distance of PMs from PL), road traffic conditions (high traffic vs low traffic, fast lane vs slow lane, etc.), resource occupancy or channel busy rates of available Mode 2 resources (and corresponding Mode 2 resource pools), UE capabilities and statuses of PMs, etc.

Figure 4:
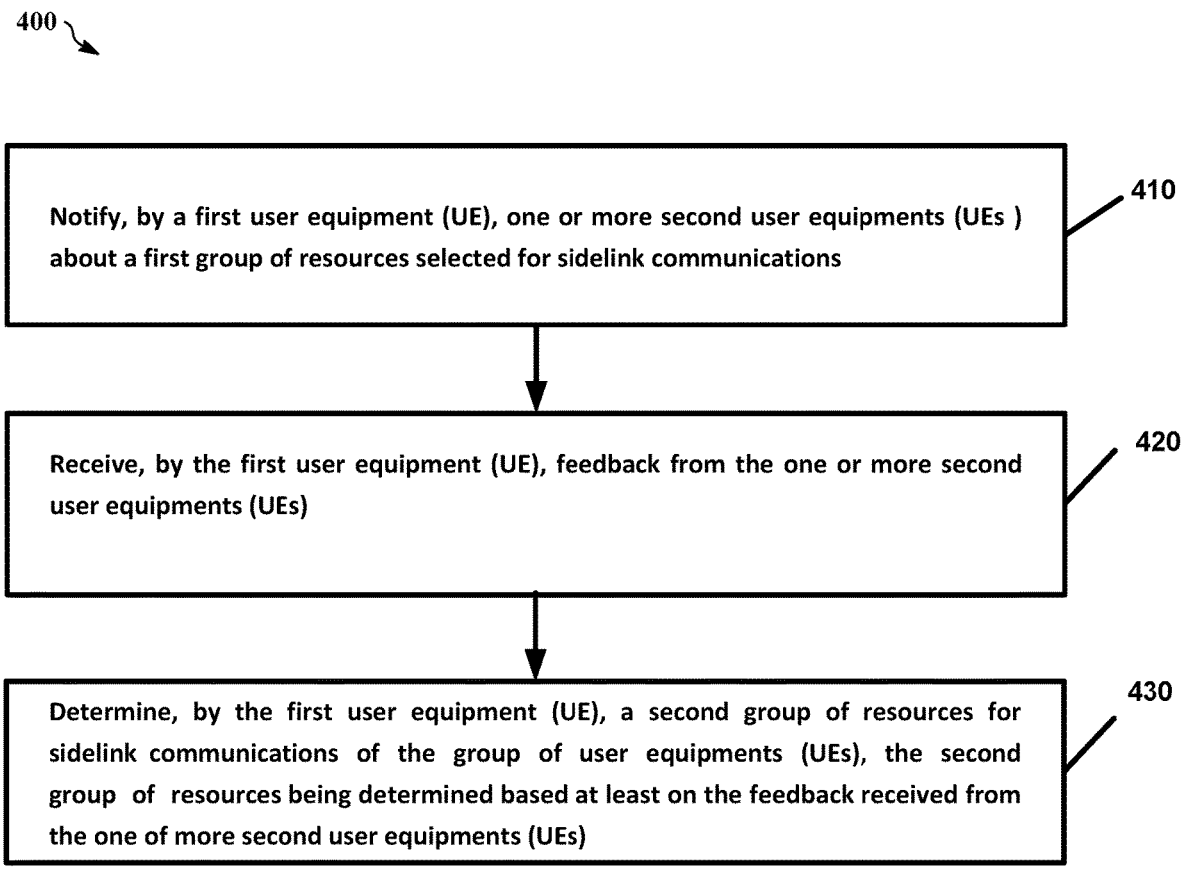
FIG. 4 is a flow chart illustrating joint management of resources of V2X communications, according to an additional example implementation.

FIG. 4 is a flow chart 400 illustrating joint management of resources for V2X communications of a platoon, according to at least one example implementation.

At block 410, a first UE, e.g., PL 312, may notify one or more second UEs, e.g., PMs 316 and 318, about a first group of resources ($G_1$) selected for V2X communications. In an example implementation, the first UE, e.g., PL/PM 312, acts as a lead UE for the group of UEs. The lead UE is also referred to as a platoon leader of the members in the platoon.

At block 420, the first UE may receive feedback from the one or more second user equipments (UEs). In an example implementation, the feedback indicates whether a resource conflict exists.

At block 430, the first UE, e.g., PL 312, may determine a second group of resources for V2X communications of the group of UEs. In an example implementation, the first UE/PL may determine the second group of resources based at least on the feedback received from the one or more second UEs.

Example 1. A method of communications, comprising: notifying, by a first user equipment (UE), one or more second user equipments (UEs) about a first group of resources selected for sidelink communications, the first user equipment (UE) and the one or more second user equipments (UEs) of a group of user equipments (UEs) with the first user equipment (UE) as a lead user equipment (UE) of the group of user equipments (UEs); receiving, by the first user equipment (UE), feedback from the one or more second user equipments (UEs); and determining, by the first user equipment, a second group of resources for sidelink communications of the group of user equipments (UEs), the second group of resources being determined based at least on the feedback received from the one or more second user equipments (UEs).

Example 2. According to an example aspect of the method of Example 1, further comprising: notifying, by the first user equipment (UE), one or more third user equipments (UEs)

about the second group of resources for sidelink communications of the group of user equipments (UEs).

Example 3. According to an example aspect of the method of Example 1, further comprising: notifying, by the first user equipment (UE), the group of user equipments (UEs) about the second group of resources for sidelink communications of the group of user equipments (UEs).

Example 4. According to an example aspect of the method of Example 2 or 3, wherein the notifying about the first group of resources and/or the second group of resources is via one or more instances of sidelink control information (SCI).

Example 5. According to an example aspect of the method of Example 4, wherein an instance of the sidelink control information (SCI) is transmitted over a physical sidelink control channel (PSCCH).

Example 6. According to an example aspect of the method of Example 4 or 5, wherein the sidelink control information (SCI) includes information on the first group of resources and/or the second group of resources.

Example 7. According to an example aspect of the method of Example 4, wherein the sidelink control information (SCI) is an enhanced sidelink control information (SCI) or a modified version of existing sidelink control information (SCI), for resource management of the group of user equipments (UEs).

Example 8. According to an example aspect of the method of Example 1, wherein the feedback received from a user equipment (UE) of the one or more second user equipments (UE), indicates whether a resource-associated conflict exists for a resource of the first group of resources at that user equipment (UE).

Example 9. According to an example aspect of the method of Example 8, wherein the feedback, when a resource-associated conflict exists, indicates an alternate resource.

Example 10. According to an example aspect of the method of Example 8, wherein the feedback indicates that no resource-associated conflict exists.

Example 11. According to an example aspect of the method of Example 1, wherein the feedback is received, by the first user equipment (UE), via a physical sidelink feedback channel (PSFCH).

Example 12. According to an example aspect of the method of Example 1, further comprising: selecting, by the first user equipment (UE), the first group of resources from one or more pools of configured resources.

Example 13. According to an example aspect of the method of Example 12, wherein the one or more pools of configured resources are Mode 2 resources.

Example 14. According to an example aspect of the method of Example 12 or 13, wherein the first group of resources is selected from the one or more pools of configured resources using random selection or sensing-based selection.

Example 15. According to an example aspect of the method of Example 12, wherein the first group of resources selected by the first user equipment (UE) includes continuous or discrete resources.

Example 16. An apparatus comprising at least one processor and at least one memory including computer instructions, when executed by the at least one processor, cause the apparatus to perform a method of any of Examples 1-15.

Example 17. An apparatus comprising means for performing a method of any of Examples 1-15.

Example 18. A non-transitory computer-readable storage medium having stored thereon computer executable program code which, when executed on a computer system, causes the computer system to perform the steps of any of Examples 1-15.

Figure 5:
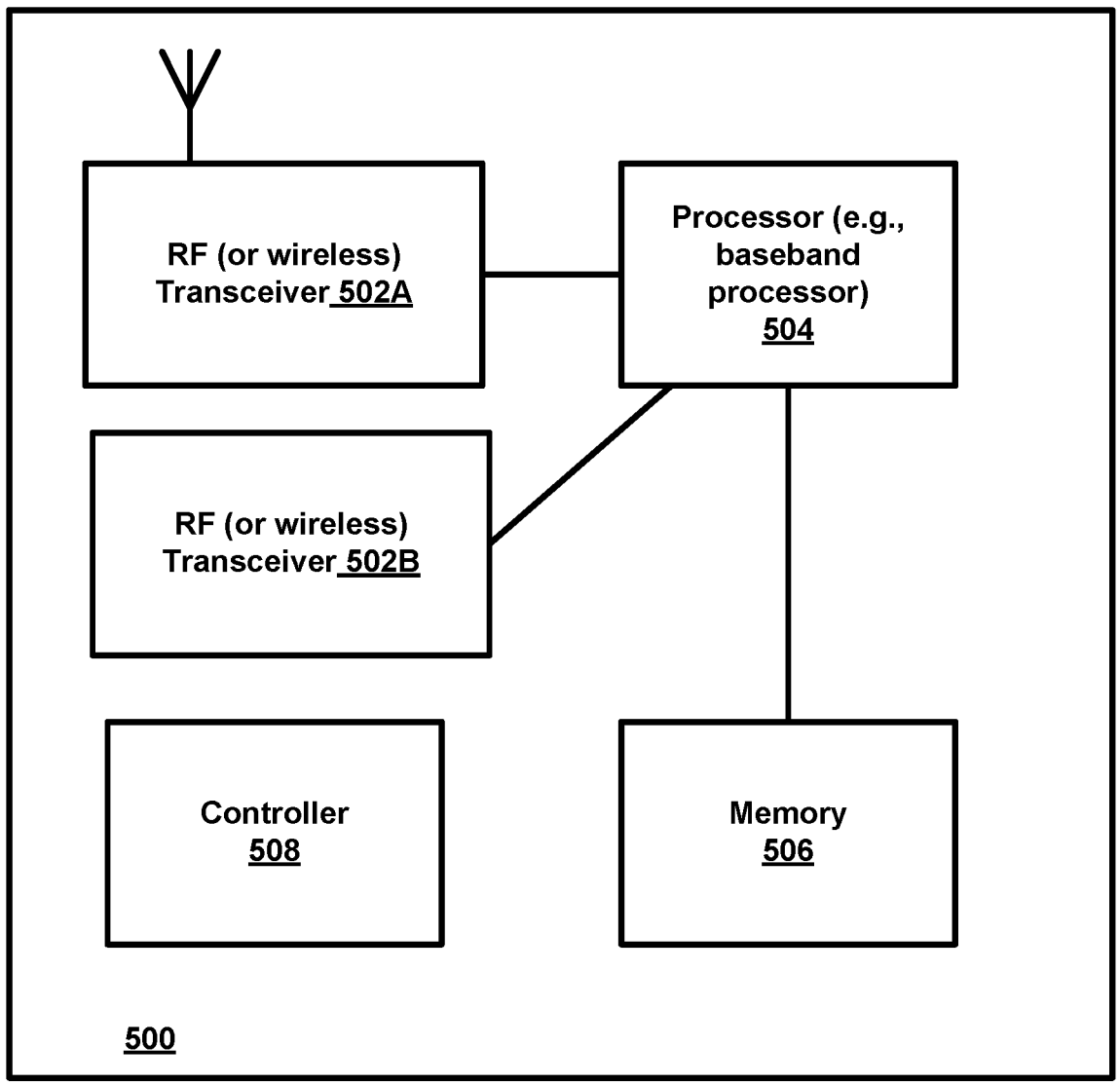
FIG. 5 is a block diagram of a node or wireless station (e.g., base station/access point or mobile station/user device/UE), according to an example implementation.

FIG. 5 is a block diagram of a wireless station (e.g., user equipment (UE)/user device or AP/gNB/MgNB/SgNB) 500 according to an example implementation. The wireless station 500 may include, for example, one or more RF (radio frequency) or wireless transceivers 502A, 502B, where each wireless transceiver includes a transmitter to transmit signals and a receiver to receive signals. The wireless station also includes a processor or control unit/entity (controller) 504/508 to execute instructions or software and control transmission and receptions of signals, and a memory 506 to store data and/or instructions.

Processor 504 may also make decisions or determinations, generate frames, packets or messages for transmission, decode received frames or messages for further processing, and other tasks or functions described herein. Processor 504, which may be a baseband processor, for example, may generate messages, packets, frames or other signals for transmission via wireless transceiver 502 (502A or 502B). Processor 504 may control transmission of signals or messages over a wireless network, and may control the reception of signals or messages, etc., via a wireless network (e.g., after being down-converted by wireless transceiver 502, for example). Processor 504 may be programmable and capable of executing software or other instructions stored in memory or on other computer media to perform the various tasks and functions described above, such as one or more of the tasks or methods described above. Processor 504 may be (or may include), for example, hardware, programmable logic, a programmable processor that executes software or firmware, and/or any combination of these. Using other terminology, processor 504 and transceiver 502 together may be considered as a wireless transmitter/receiver system, for example.

In addition, referring to FIG. 5, a controller (or processor) 508 may execute software and instructions, and may provide overall control for the station 500, and may provide control for other systems not shown in FIG. 5, such as controlling input/output devices (e.g., display, keypad), and/or may execute software for one or more applications that may be provided on wireless station 500, such as, for example, an email program, audio/video applications, a word processor, a Voice over IP application, or other application or software. Moreover, a storage medium may be provided that includes stored instructions, which when executed by a controller or processor may result in the processor 504, or other controller or processor, performing one or more of the functions or tasks described above.

According to another example implementation, RF or wireless transceiver(s) 502A/502B may receive signals or data and/or transmit or send signals or data. Processor 504 (and possibly transceivers 502A/502B) may control the RF or wireless transceiver 502A or 502B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LIE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (TOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of communications, comprising:
notifying, by a leader user equipment, a plurality of member user equipments about a first group of resources selected for sidelink communications for a group of user equipments that includes at least the leader user equipment and the plurality of member user equipments, wherein the first group of resources includes a plurality of discrete portions;
configuring, by the leader user equipment, a first member user equipment of the plurality of member user equipments, to validate only a single discrete portion of the plurality of discrete portions of the first group of resources;
configuring, by the leader user equipment, a second member user equipment of the plurality of member user equipments, to validate all of the first group of resources including the plurality of discrete portions;
receiving, by the leader user equipment based on the configuring, a first feedback from the first member user equipment indicating whether a resource-associated conflict exists for the single discrete portion of the first group of resources that has been configured for validation by the first member user equipment, and a second feedback from the second member user equipment indicating whether a resource-associated conflict exists for any resources of the first group of resources;

determining, by the leader user equipment, a second group of resources for sidelink communications of the group of user equipments, the second group of resources being determined based at least on the feedback; and notifying, by the leader user equipment, one or more user equipments of the plurality of member user equipments about the second group of resources for sidelink communications for the group of user equipments.

2. The method of claim 1, comprising:
wherein the configuring of the first member user equipment comprises configuring, by the leader user equipment, the first member user equipment to validate only a first discrete portion of the plurality of discrete portions of the first group of resources; and the method further comprising configuring, by the leader user equipment, a third member user equipment to validate only a second discrete portion of the plurality of discrete portions of the first group of resources.

3. The method of claim 1:
wherein the first feedback comprises an indication that a resource-associated conflict exists for the single discrete portion with respect to another user equipment of a lower priority user class; and wherein the notified second group of resources includes the first discrete portion for which a resource-associated conflict exists with respect to the another user equipment of the lower priority user class.

4. The method of claim 1, wherein the notifying about the first group of resources and/or the second group of resources is via one or more instances of sidelink control information.

5. The method of claim 4, wherein an instance of the sidelink control information is transmitted over a physical sidelink control channel.

6. The method of claim 4, wherein the sidelink control information includes information on the first group of resources and/or the second group of resources.

7. The method of claim 4, wherein the sidelink control information is an enhanced sidelink control information or a modified version of existing sidelink control information, for resource management of the group of user equipments.

8. The method of claim 1, wherein:
the feedback, when a resource-associated conflict exists, indicates an alternate resource.

9. The method of claim 1, wherein the feedback is received, by the first user equipment, via a physical sidelink feedback channel.

10. The method of claim 1, further comprising:
selecting, by the first user equipment, the first group of resources from one or more pools of configured resources.

11. The method of claim 10, wherein the one or more pools of configured resources are Mode 2 resources.

12. The method of claim 10, wherein the first group of resources is selected from the one or more pools of configured resources using random selection or sensing-based selection.

13. The method of claim 10, wherein the first group of resources selected by the first user equipment includes continuous or discrete resources.

14. The method of claim 1, further comprising:
configuring, by the first user equipment, one or more of the other user equipments to perform resource validation and resource reservation for the group of user devices.

15. The method of claim 1, further comprising:
configuring, by the first user equipment, one or more of the other user equipments to announce a joint resource reservation for the group of user equipments.

16. An apparatus comprising at least one processor and at least one memory including computer instructions, when executed by the at least one processor, cause the apparatus to:
notify, by a leader user equipment, a plurality of member user equipments about a first group of resources selected for sidelink communications for a group of user equipments that includes at least the leader user equipment and the plurality of member user equipments, wherein the first group of resources includes a plurality of discrete portions;

configure, by the leader user equipment, a first member user equipment of the plurality of member user equipments, to validate only a single discrete portion of the plurality of discrete portions of the first group of resources;

configure, by the leader user equipment, a second member user equipment of the plurality of member user equipments, to validate all of the first group of resources including the plurality of discrete portions;

receive, by the leader user equipment based on the configuring, a first feedback from the first member user equipment indicating whether a resource-associated conflict exists for the single discrete portion of the first group of resources that has been configured for validation by the first member user equipment, and a second feedback from the second member user equipment indicating whether a resource-associated conflict exists for any resources of the first group of resources;

determine, by the leader user equipment, a second group of resources for sidelink communications of the group of user equipments, the second group of resources being determined based at least on the feedback; and notify, by the leader user equipment, one or more user equipments of the plurality of member user equipments about the second group of resources for sidelink communications for the group of user equipments.

17. The apparatus of claim 16, wherein the computer instructions and the at least one processor configured to notify about the first group of resources and/or the second group of resources comprises the computer instructions and the at least one processor configured to notify about the first group of resources and/or the second group of resources via one or more instances of sidelink control information.

18. The apparatus of claim 17, wherein an instance of the sidelink control information is transmitted over a physical sidelink control channel.

19. The apparatus of claim 17, wherein the sidelink control information includes information on the first group of resources and/or the second group of resources.

20. The apparatus of claim 17, wherein the sidelink control information is an enhanced sidelink control information or a modified version of existing sidelink control information, for resource management of the group of user equipments.

* * * * *